US007961636B1

(12) United States Patent
Barach et al.

(10) Patent No.: US 7,961,636 B1
(45) Date of Patent: Jun. 14, 2011

(54) VECTORIZED SOFTWARE PACKET FORWARDING

(75) Inventors: David Richard Barach, Boxborough, MA (US); Eliot Dresselhaus, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1116 days.

(21) Appl. No.: 10/855,213

(22) Filed: May 27, 2004

(51) Int. Cl.
*H04L 12/28* (2006.01)
(52) U.S. Cl. .................. 370/252; 370/392
(58) Field of Classification Search .......... 370/217–220, 370/230, 238, 253, 332, 355, 356, 382, 392, 370/396–399, 395.7, 400, 401, 428, 517, 370/519, 508, 328; 712/11; 715/853
See application file for complete search history.

(56) References Cited

U.S. PATENT DOCUMENTS

| 5,392,446 | A * | 2/1995 | Tower et al. ............ 712/11 |
| 5,917,820 | A | 6/1999 | Rekhter |
| 2003/0214945 | A1* | 11/2003 | Kawamura ............ 370/389 |
| 2004/0146007 | A1* | 7/2004 | Saadawi et al. ............ 370/238 |
| 2005/0190717 | A1* | 9/2005 | Shu et al. ............ 370/328 |
| 2010/0005425 | A1* | 1/2010 | Kodosky et al. ............ 715/853 |

OTHER PUBLICATIONS

Perlman, Radia, "Interconnections Second Edition: Bridges, Routers, Switches, and Internetworking Protocols," Chapter 1, Section 1.1, pp. 1-7, 2000.

* cited by examiner

*Primary Examiner* — Seema S Rao
*Assistant Examiner* — Leon Andrews
(74) *Attorney, Agent, or Firm* — Cesari and McKenna, LLP (57) ABSTRACT

An intermediate network node is configured to forward a plurality of packets concurrently, e.g., as a vector, rather than one packet at a time. As such, the node can load a single sequence of forwarding instructions that may be repeatedly executed for packets in the vector. In addition, the intermediate network node adaptively controls the rate at which it processes data packets through a directed forwarding graph. To that end, the intermediate node is configured to dynamically select the number of packets per vector, i.e., vector size, processed at each node of the forwarding graph. Further, the intermediate node also may be configured to dynamically select timing intervals for one or more "node timers" used to control the rate at which packets traverse through the graph. Illustratively, the vector size and node-timer intervals are selected so that the average latency through the forwarding graph is less than a predetermined target latency, e.g., 50 microseconds (μs).

35 Claims, 8 Drawing Sheets

VECTORIZED SOFTWARE PACKET FORWARDING

FIELD OF THE INVENTION

This invention relates generally to network communications, and, more specifically, to an efficient technique for forwarding data packets in an intermediate network node, such as a router or switch.

BACKGROUND OF THE INVENTION

A computer network is a geographically distributed collection of interconnected subnetworks for transporting data between nodes, such as computers. A local area network (LAN) is an example of such a subnetwork. The network's topology is defined by an arrangement of client nodes that communicate with one another, typically through one or more intermediate network nodes, such as a router or switch. As used herein, a client node is an endstation node that is configured to originate or terminate communications over the network. In contrast, an intermediate network node is a node that facilitates routing data between client nodes. Communications between nodes are typically effected by exchanging discrete packets of data according to predefined protocols. In this context, a protocol consists of a set of rules defining how the nodes interact with each other.

The data packets transferred among the nodes may include fixed-sized data cells and/or variable-sized data frames. Each data packet typically comprises "payload" data prepended ("encapsulated") by at least one network header formatted in accordance with a network communication protocol. The network headers include information that enables the client nodes and intermediate nodes to efficiently route the packet through the computer network. Often, a packet's network headers include at least a data-link (layer 2) header and an internetwork (layer 3) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information for transmitting the packet over a particular physical link (i.e., a communication medium), such as a point-to-point link, Ethernet link, wireless link, optical link, etc. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header provides information defining the packet's logical path (or "virtual circuit") through the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the client node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

In operation, a client node sends a data packet to a network interface of the intermediate network node. The intermediate network node determines how to process the packet, e.g., based on which network interface the packet is received. For example, the intermediate network node may perform a path switching function that simply re-directs the packet from one network interface to another. In this case, the packet may be transmitted over a network interface that has been previously associated with the packet's destination MAC address.

Alternatively, the intermediate network node may perform a path determination, or forwarding decision, function that selects the most appropriate network interface to forward the packet. Specifically, the intermediate network node may parse a destination IP address from the packet's internetwork header and perform an "address lookup" operation to locate routing information corresponding to the parsed address. Here, routing information is broadly understood to include any information, such as adjacency information, bridge-forwarding information, etc., that may be used to determine the packet's next hop, and, in some cases, provide other services such as quality-of-service, billing, and so forth. After the packet's next-hop address is identified using the located routing information, the packet's layer-2 (MAC) information may be modified before the packet transmitted to its next destination.

Typically, forwarding decisions are performed by a forwarding engine module executing in the intermediate network node. The forwarding engine, or data plane, is configured to process received data packets and render forwarding decisions based on a predetermined set of routing information. A router operating system, or control plane, often manages the set of routing information, ensuring that it remains up-to-date for the forwarding engine to access. In addition, the router operating system may provide other management services in the intermediate network node. For instance, the operating system may cooperate with other nodes in the network to disseminate and process network-topography information in accordance with a conventional network protocol, such as the Open Shortest Path First (OSPF) protocol. To that end, the operating system may be configured to process control packets addressed to the intermediate network node. The data and control planes are often implemented as separate processes (or threads) executing on a uniprocessor or multiprocessor system. Those skilled in the art will appreciate that the control and data planes may be implemented in various arrangements of hardware, software, or combinations thereof.

Conventional forwarding engines often process received data packets using a directed forwarding graph. As understood in the art, the directed graph includes one or more graph nodes that are interconnected by a set of "edges." Each edge connects a pair of graph nodes and associates a direction for progressing from one node to the other. In this sense, each edge in the directed forwarding graph is a "one-way" (i.e., unidirectional) edge. A single graph node may be coupled to one or more other graph nodes by a corresponding set of one-way edges. Thus, a path may be traversed through the forwarding graph by moving from node to node in a direction defined by the nodes' interconnecting edges.

Each graph node in the forwarding engine's directed forwarding graph is associated with a corresponding forwarding operation. That is, each graph node is associated with a corresponding set of forwarding instructions that, when executed, enable the forwarding engine to perform the node's forwarding operation. The forwarding graph may be statically created so that packets of the same type will traverse a predictable, deterministic path through the graph. As such, the forwarding engine performs the same set of forwarding operations for each packet of a given packet type. For example, a predetermined set of forwarding operations may be performed for layer-2 tunnel protocol (L2TP) packets that traverse a first path through the forwarding graph, whereas point-to-point protocol over Ethernet (PPPoE) packets follow a second forwarding-graph path and thus undergo a different set of forwarding operations. In practice, the intermediate network node usually receives data packets of the same type with few variations. Accordingly, most received data packets tend to traverse the same path in the forwarding engine's directed forwarding graph.

Figure 1:
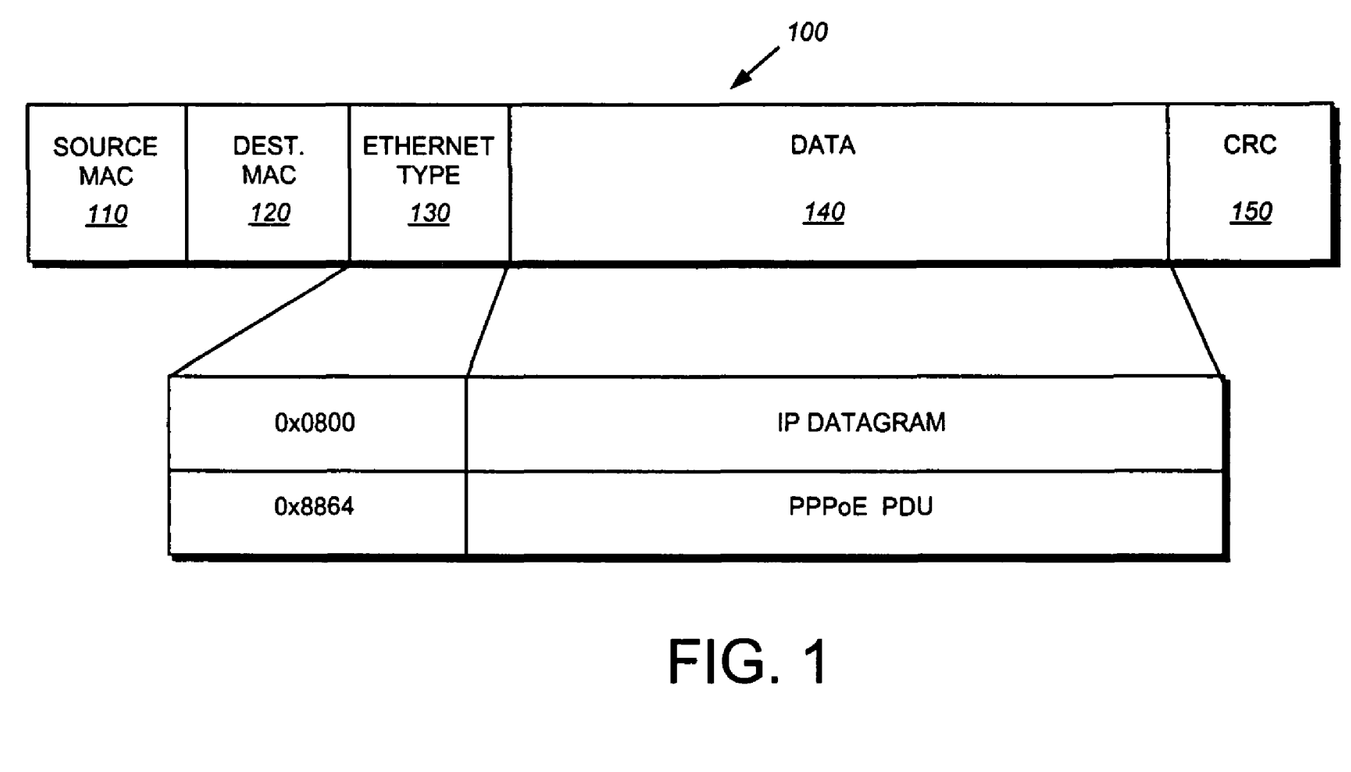
FIG. 1, previously described, is a schematic block diagram of an exemplary data packet that may be used in accordance with the present invention.

FIG. 1 illustrates the contents of an exemplary data packet 100 that may be received at a network interface of an intermediate network node. The packet is a conventional 802.3 Ethernet frame including, inter alia, a source MAC field 110, a destination MAC field 120, an Ethernet-type field 130, a data portion 140 and a cyclic redundancy check (CRC) field 150. Notably, the Ethernet frame may also include other data-link information (not shown), such as link-layer control (LLC) and subnetwork access protocol (SNAP) information.

The source and destination MAC address fields store, e.g., 48-bit values, that respectively identify the network interface from which the packet is sent and the network interface to which the packet is addressed. The Ethernet-type field 130 stores a value that identifies the type of data stored in the data portion 140. For example, an Ethernet-type field equal to the hexadecimal value 0x0800 may indicate that the data portion contains an IP datagram, such as an L2TP data packet. Alternatively, an Ethernet-type field equal to 0x8864 may correspond to a PPPoE protocol data unit (PDU) stored in the data portion. The CRC field 150 stores a data-integrity check value that may be used to detect and/or correct errors in the packet 100 after the packet is received by the intermediate network node.

Figure 2:
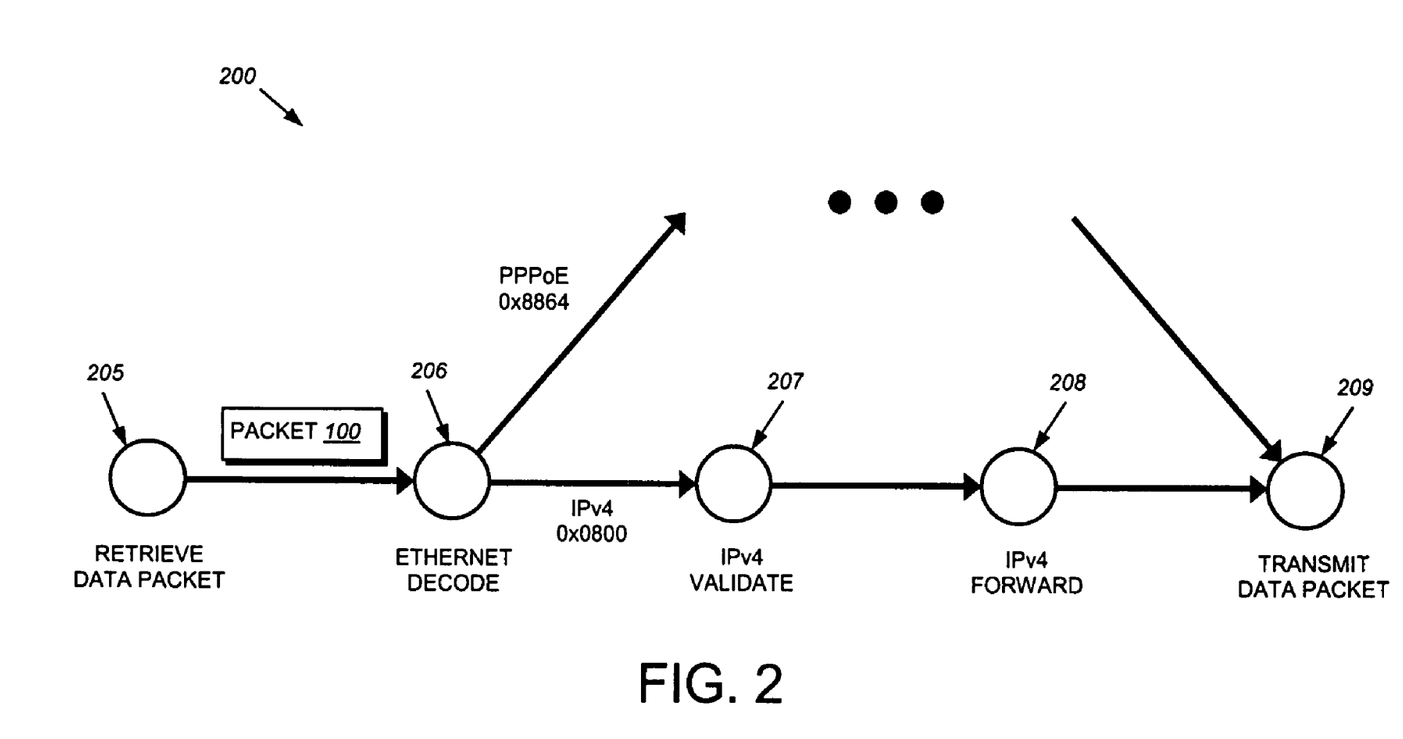
FIG. 2, previously described, is a schematic block diagram of a directed forwarding graph that may be used to render a forwarding decision for a received data packet.

FIG. 2 illustrates an exemplary directed forwarding graph 200 that a forwarding engine may employ for processing the data packet 100. The graph comprises a plurality of graph nodes, each associated with a different forwarding operation. For example, a first graph node 205 may be configured to retrieve (or otherwise access) the received data packet 100, e.g., stored at a known location in the intermediate network node. A second graph node 206 may examine the value of the Ethernet-type field 130 to "decode" the received packet type. Depending on the packet type, the packet 100 is directed to an appropriate subsequent graph node. For instance, IP datagrams and PPPoE PDUs may be directed to different graph nodes based on their respective Ethernet-type field values. By way of example, suppose that the packet 100 is a conventional IP version 4 (IPv4) datagram whose Ethernet-type field equals 0x0800.

In this case, the packet 100 is forwarded to a third graph node 207 that performs standard IPv4 validation operations, such as verifying that the packet's time-to-live value has not expired, validating the packet's IP-header checksums, etc. Next, the packet is directed to a fourth graph node 208 configured to route the packet to its next destination. Specifically, when the packet reaches the node 208, an IPv4 address lookup operation is performed to locate routing information identifying the packet's next hop. The packet's source and destination MAC address values 110 and 120 are then modified appropriately. Last, the updated packet 100 is passed to a fifth graph node 209 that is configured to transmit the packet over a physical link coupled to the packet's next destination.

The conventional directed forwarding graph described above suffers various disadvantages. For instance, the forwarding engine may experience a relatively large number of cache misses for each packet processed through the forwarding graph. More specifically, for each graph node that processes the packet 100, the node's corresponding set of forwarding instructions is typically loaded into an instruction cache (I-cache) memory accessible to the processing core executing the forwarding engine. In practice, the number of graph-node instructions loaded into the I-cache memory often exceeds the size, e.g., 32 kilobytes (kB), of the cache memory. Accordingly, some instructions will replace other, previously-loaded instructions. As a result, the replaced instruction(s) may not be accessible in the I-cache when the forwarding engine is ready to execute them. As understood in the art, a cache miss results when the forwarding engine attempts to retrieve information which is not resident in the cache.

Forwarding instructions that are not accessible in the I-cache, and thus result in I-cache misses, are usually retrieved from a predetermined location in a "main" instruction memory coupled to the forwarding engine's processing core. The amount of time required to retrieve instructions from the main memory is significantly longer (in terms of clock cycles) than accesses to the much faster I-cache memory. Moreover, instructions that are not located in the I-cache or in the main memory may have to be retrieved from an even slower mass storage medium in the intermediate network node. Thus, the relatively large number of I-cache misses per packet conventionally experienced by the forwarding engine may result in an excessive number of main-memory accesses and/or storage medium accesses which significantly slow the engine's forwarding operations.

In addition, the forwarding engine's performance also may be negatively affected by cache misses that occur in its data cache (D-cache) memory. One or more forwarding instructions may, when executed in the forwarding graph, instruct the processing core to retrieve data from the main memory. For instance, some of the instructions may direct the processing core to "prefetch" data into the D-cache memory before the data is accessed by subsequently loaded instruction(s). As such, the subsequent instructions can quickly access the prefetched data from the D-cache memory without having to retrieve the data from the slower main memory. Accordingly, cache misses may occur when retrieved data is written to the D-cache memory and consequently overwrites previously-retrieved data. The processing core may have to consume processing time and resources to later retrieve the over-written, "missed" data from the main memory.

Prior attempts have been made to reduce the number of I-cache and D-cache misses that occur per packet in the forwarding graph. These attempts have traditionally employed techniques for optimizing the forwarding code in the forwarding graph. Such techniques include, for example, conventional prefetch scheduling and loop-unrolling mechanisms. The effectiveness of these code-optimization techniques is based on the fact that a predictable pattern of I-cache and D-cache misses per packet can be anticipated based on knowledge of the packet's path through the forwarding graph, i.e., most received packets are of the same packet type and thus traverse the same path through the graph. In other words, packets are typically processed by predictable sequences of forwarding instructions which, in turn, result in a predictable pattern of I-cache and D-cache misses. While the prior code-optimization techniques are effective in reducing the number of I-cache and D-cache misses per packet, they generally do not reduce the number of cache misses enough to have a significant effect on the forwarding engine's performance.

It is therefore desirable to implement a forwarding engine that can further reduce the number of I-cache and D-cache misses per packet, thereby enabling the engine to process data packets faster and more efficiently through the forwarding graph.

SUMMARY OF THE INVENTION

The present invention provides an intermediate network node that is configured to forward a plurality of packets concurrently, e.g., as a vector, rather than one packet at a time. As such, the node can load a single sequence of forwarding instructions that may be repeatedly executed for packets in the vector. Thus, the instructions are loaded into instruction cache (I-cache) memory once per vector and not once per packet as conventionally done. As a result, the number of I-cache misses per packet is significantly reduced, e.g., by one or more orders of magnitude. Furthermore, vectorizing the intermediate network node's forwarding graph also may reduce the number of data cache (D-cache) misses per packet. For instance, data stored in the D-cache may be used to process a plurality of packets in a vector without having to re-retrieve the data multiple times. By forwarding packets in units of vectors, the intermediate network node reduces the number of I-cache and D-cache misses that occurs per packet, thereby enabling it to forward packets more efficiently (e.g., 2-4 times faster) than in previous implementations.

In accordance with an illustrative embodiment, the intermediate network node adaptively controls the rate at which it processes data packets through a directed forwarding graph. To that end, the intermediate network node is configured to dynamically select the number of packets per vector, i.e., vector size, processed at each node of the forwarding graph. Further, the intermediate network node also may be configured to dynamically select timing intervals for one or more "node timers" used to control the rate at which packets traverse through the graph. More specifically, each graph node may be associated with a corresponding timer interval which defines the maximum amount of time (e.g., seconds or clock cycles) that a partially-filled vector may reside at that node.

Illustratively, the vector size and node-timer intervals are selected so that the average latency through the forwarding graph is less than a predetermined target latency, e.g., 50 microseconds (μs). The intermediate network node monitors the forwarding-graph latency via various measurable statistics, such as the rate at which packets are input to the graph and the average time required to process a packet through the graph. To ensure that these statistics are not skewed, e.g., by non-representative measurements, the intermediate network node preferably randomizes the time horizon over which its statistics are measured. The statistics may be periodically updated, e.g., every millisecond.

By way of example, suppose the intermediate network node's statistics indicate that packets enter the forwarding graph at a relatively low rate, such as at hundreds of packets per second. In this case, the intermediate network node may choose a relatively small vector size to ensure that the time required to accumulate the vector's packets and process the vector through the forwarding graph is less than the target latency. Conversely, the intermediate network node may increase the vector size when packets are input to the graph at a higher rate, such as at millions of packets per second. The intermediate network node preferably recalculates the vector size periodically, e.g., every millisecond, based on its measured statistics. In addition, the intermediate network node may select node-timer intervals for its graph nodes, e.g., depending on measured rates of traffic processed at the graph nodes. For instance, graph nodes that receive packets at relatively faster rates may be associated with shorter node-timer intervals in order to prevent processing delays that could increase the average latency through the forwarding graph above the target latency.

Still further to the illustrative embodiment, one or more graph nodes may associate a relatively small amount of auxiliary (AUX) data with each packet vector processed at that node. The AUX data may include, inter alia, various packet-related information, such as packet-type identifiers, hash keys, etc. By passing the AUX data between graph nodes, the number of data reads performed in the forwarding graph can be reduced, thereby further decreasing the occurrence of D-cache misses. Advantageously, the intermediate network node may employ one or more vector processors and/or super-scalar processors adapted to process the packet vectors and/or the AUX data in a more efficient manner. In these embodiments, the AUX data may be arranged as a vector that is separate from its associated packet vector. Alternatively, the AUX data may be directly concatenated with its packet vector.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 3:
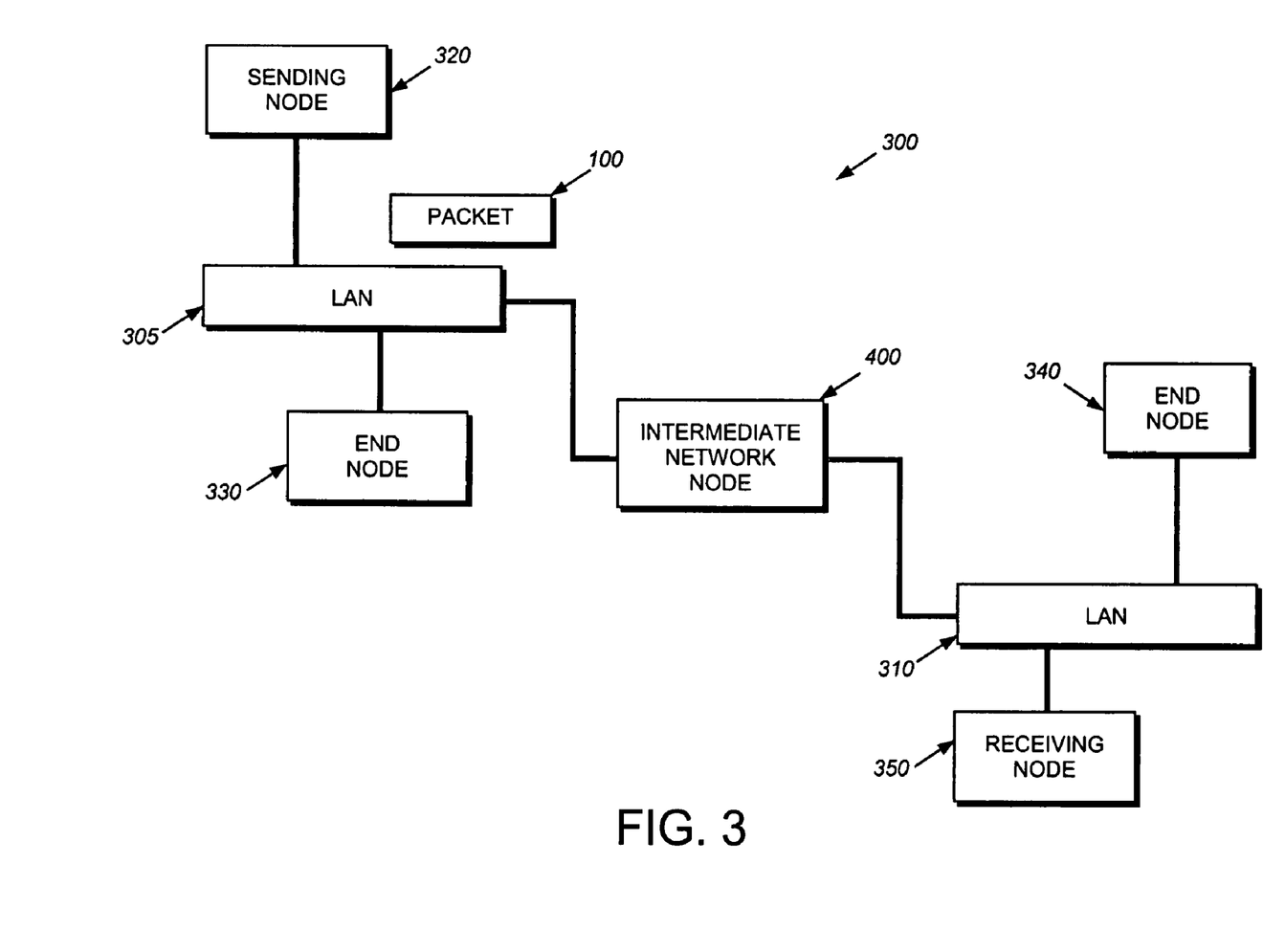
FIG. 3 is a schematic block diagram of a computer network comprising a collection of interconnected subnetworks and nodes, including an intermediate network node.

FIG. 3 is a block diagram of a computer network 300 comprising a collection of interconnected subnetworks and nodes. The network nodes may comprise computers including end nodes 330 and 340, such as a sending end node 320 and a receiving end node 350, and an intermediate network node 400, the latter of which may be a switch or router. The subnetworks 305, 310 included within network 300 are preferably local area networks (LANs) interconnected by the intermediate node 400, although the networks may comprise other communication links, such as wide area networks. Communication among the nodes coupled to the LANs is typically effected by exchanging discrete data packets 100 among the nodes.

For example, the sending node 320 generates a data packet 100 by encapsulating "payload" data within headers, such as conventional data link and internetwork headers, as the data passes through different layers of a protocol stack. The packet is then transmitted over the network to the intermediate node 400 which facilitates the flow of the data packet through the network by routing it to the proper receiving node 350. Specifically, the intermediate node 400 receives the packet at one of its network interfaces and renders a forwarding decision for the packet based on a destination end node specified by the packet's internetwork header. The packet's data link header is modified in accordance with the forwarding decision and the packet is transmitted over an appropriate subnetwork 305 or 310.

Figure 4:
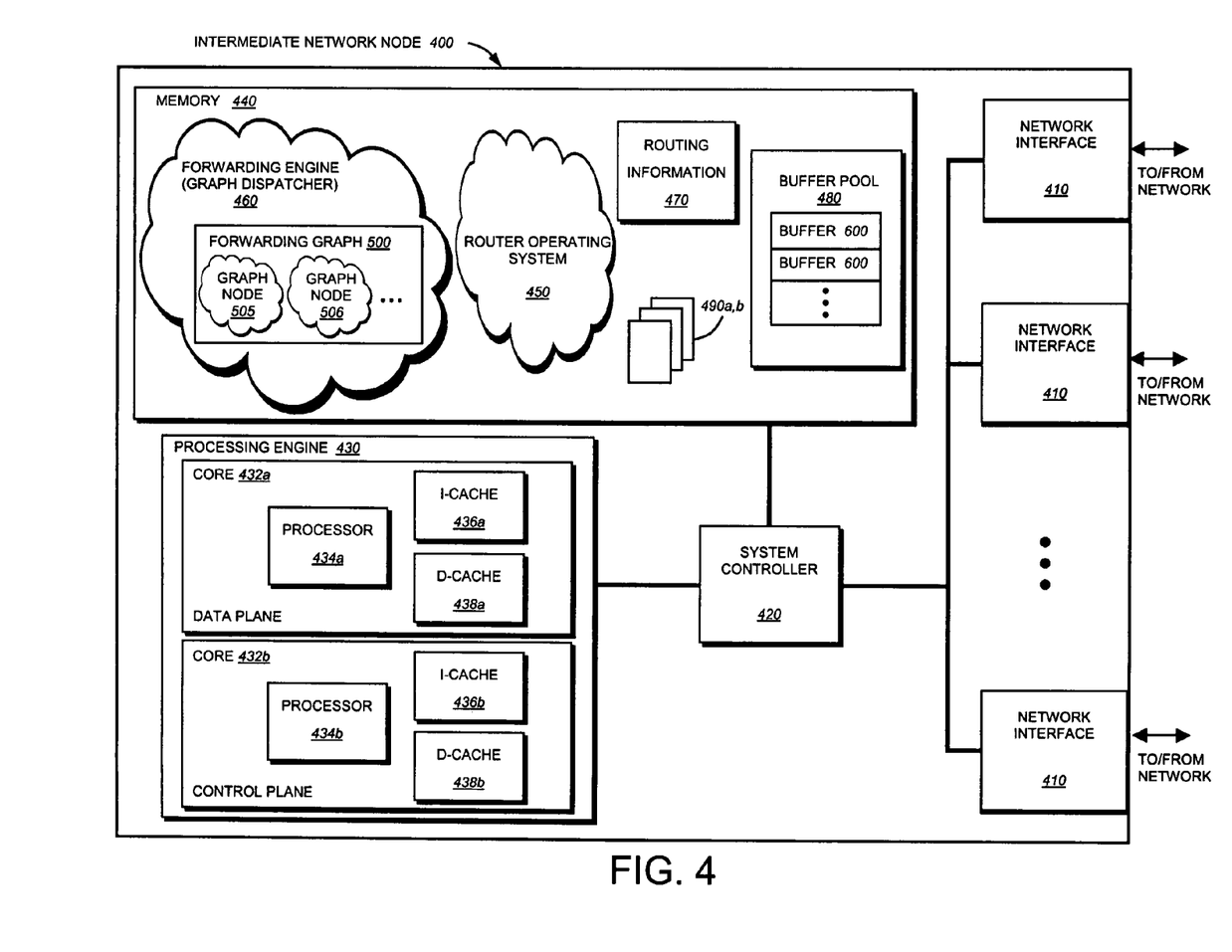
FIG. 4 is a schematic block diagram of an illustrative intermediate network node that may be used in accordance with the present invention.

FIG. 4 is a schematic block diagram of the intermediate node 400 that may be advantageously used with the present invention. The intermediate network node is generally configured to send and receive data packets 100, and in some embodiments the node may be configured to process packets primarily of a predetermined packet type. For instance, the intermediate network node 400 may be a L2TP Access Concentrator (LAC) or L2TP Network Server (LNS) configured to send and receive packets formatted in accordance with the L2TP protocol.

The intermediate network node 400 comprises a plurality of network interfaces 410, a system controller 420, a processing engine 430 and a "main" memory 440. Data is received by the network interfaces 410, each of which is coupled to at least one network or subnetwork, such as LANs 305 and 310. The network interfaces contain the mechanical, electrical and signaling circuitry that enables the intermediate network node 400 to communicate over physical links connected to networks and subnetworks, including, inter alia, asynchronous transfer mode (ATM) networks, synchronous optical networks (SONET), wireless networks, frame relay networks, Ethernet networks, Fiber Distributed Data Interface (FDDI) networks, etc.

The system controller 420 is coupled to the network interfaces 410, the processing engine 430 and the memory 440 by different local buses in the intermediate network node 400. For instance, the system controller may be coupled to the network interfaces 410 by respective peripheral component interconnect (PCI) buses, whereas the controller may be coupled to the memory 440 by a plurality of high-speed connections, such as Hyper-Transport bus links. The controller 420 therefore functions as a "bridge" for transferring data from one local bus to another. That is, the controller receives data over a first local bus, e.g., coupled to a network interface 410, and converts the data to a format that may be transmitted over a second local bus, e.g., coupled to the memory 440. The system controller also may include other functionality, such as application-specific circuitry or logic. The controller 420 may be embodied in hardware as a field-programmable gate array (FPGA) or an application-specific integrated circuit (ASIC), although the controller's functionality alternatively may be implemented in various combinations of hardware and/or software.

The processing engine 430 comprises one or more processing cores that implement the control and data planes in the intermediate network node 400. For example, a first processing core 432a in the processing engine may be adapted to execute a forwarding engine module 460 (data plane), and a second processing core 432b may be adapted to execute a router operating system 450 (control plane). To accomplish this, each processing core 432a,b may include a processor 434a,b which is tightly coupled to a corresponding instruction cache 436a,b (I-cache) and data cache 438a,b (D-cache). Illustratively, the processing engine 430 may be embodied as a dual-core processor, such as a Broadcom™ 1250 having dual-microprocessors without interlocked pipelined stages (MIPS), that executes the forwarding engine 460 on a first MIPS core 432a and the router operating system 450 on a second MIPS core 432b.

The I-cache and D-cache memories 436a,b and 438a,b may comprise high-speed static random access memories (SRAM) that are addressable by their respective processors 434a,b. Each cache memory is configured to store a predetermined amount of data or instructions, e.g., 32 kilobytes, which may be quickly accessed by its associated processor. Those skilled in the art will appreciate that the memories 436a,b and 438a,b may be organized using one or more cache arrangements known in the art, including directly mapped cache, associatively mapped cache, set-associatively mapped cache, etc.

The main memory 440 comprises a plurality of storage locations that are addressable by the processors 434a,b and the network interfaces 410 via the system controller 420. The memory 440 comprises a form of random access memory (RAM) that is generally cleared by a power cycle or other reboot operation (e.g., it is a "volatile" memory). For instance, the memory 440 may comprise dynamic random access memory (DRAM) and/or synchronous DRAM (SDRAM) storage locations adapted to store program code and data structures accessible to processors in the processing engine 430. It will be apparent to those skilled in the art that the memory 440 may also comprise other memory means, including various computer-readable media, for storing program instructions and data structures pertaining to the operation of the intermediate network node 400.

The router operating system 450, portions of which are typically resident in the memory 440 and executed by the processor 434b, functionally organizes the intermediate network node 400 by, inter alia, invoking network operations that support other software processes executing on the intermediate node. The IOS™ operating system by Cisco Systems, Inc. is one example of a router operating system 450. Illustratively, the operating system manages the contents of a set of routing information 470, e.g., stored in the main memory 440. The operating system may update the contents of the routing information 470 based on network topology information it exchanges with other intermediate network nodes. For instance, the network topology information may be transported by conventional link-state data packets, such as OSPF packets, that are addressed to the intermediate network node 400 and processed by the router operating system 450.

Figure 5:
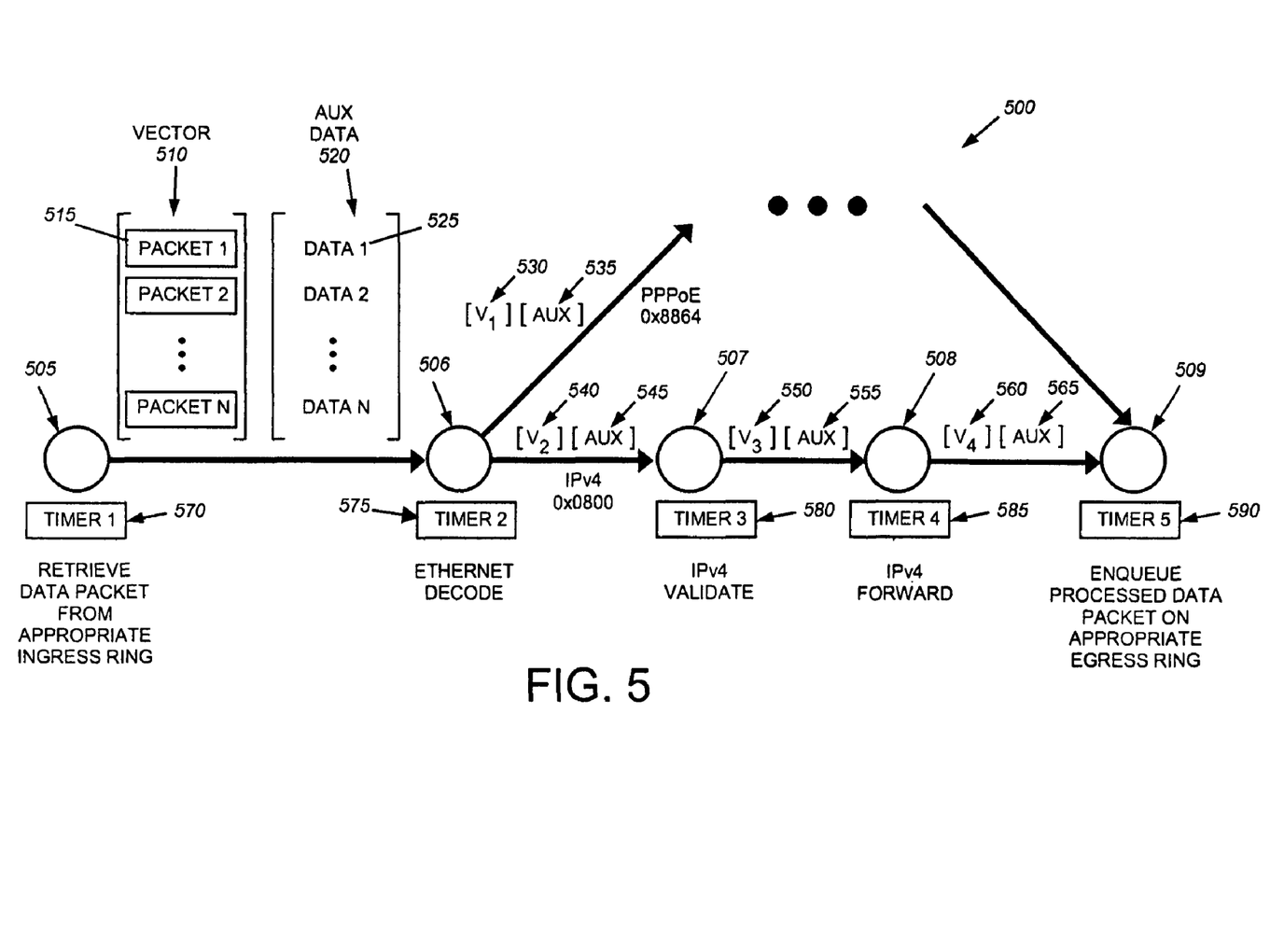
FIG. 5 is a schematic block diagram of an exemplary directed forwarding graph that advantageously may be employed by an intermediate network node in accordance with the present invention.

The forwarding engine 460, portions of which are typically resident in the memory 440 and executed by the processor 434a, may perform routing operations on data packets 100 received at the network interfaces 410. The forwarding engine 460 implements a directed forwarding graph 500 which it uses to render forwarding decisions for the received data packets. The forwarding graph includes a plurality of graph nodes, each associated with a corresponding forwarding operation. For instance, the graph may include a first graph node 505 that retrieves data packets for the forwarding engine to process; a second graph node 506 may perform Ethernet decoding operations, e.g., based on the value of an Ethernet-type field 130, and so forth. Accordingly, each graph node is associated with a corresponding set of forwarding instructions, e.g., stored in the memory 440, that enables the processor 434a to perform the node's forwarding operations.

In accordance with the present invention, the forwarding engine 460 is configured to process a plurality of packets concurrently, e.g., as a vector, at each graph node in the forwarding graph 500. More specifically, when the vector reaches a graph node, the graph node's forwarding instructions are loaded into the I-cache 436a and are repeatedly executed for each packet in the vector. As a result, the conventional number of I-cache misses and D-cache misses that occur when executing the forwarding instructions occur on a per-vector basis, and not on a per-packet basis as in previous implementations. Consequently, the forwarding graph's total number of cache misses per packet is significantly reduced, e.g., by one or more orders of magnitude, thereby enabling packets to be forwarded by the engine 460 more efficiently (e.g., 2-4 times faster).

In general, the forwarding engine 460 functions as a "graph dispatcher" which not only controls the order and timing by which packet are processed by the graph nodes, but also monitors statistics associated with the forwarding graph 500. Such measured statistics may include, inter alia, the rate at which packets are input to the forwarding graph and the average time required to process packets through the graph. To ensure that these statistics are not skewed, e.g., by non-representative measurements, the forwarding engine 460 preferably randomizes the time horizon over which its statistics are measured. For instance, the forwarding engine first may identify a range of time intervals which yield meaningful sample sizes, then randomly select a sampling interval within the identified range of intervals. The statistics may be periodically updated, e.g., every millisecond.

The forwarding engine uses its measured statistics to control the rate at which data packets are processed in the forwarding graph 500. In a preferred embodiment, the forwarding engine adjusts one or more forwarding-graph parameters to prevent the average latency through the graph from exceeding a predetermined target latency, e.g., 50 microseconds (μs). For example, the forwarding engine may use its measured statistics to adaptively select the number of packets per vector, i.e., vector size, processed at each graph node. Further, the engine 460 also may be configured to dynamically select timing intervals for one or more "node timers" used to control the rate at which packets reside at individual graph nodes. That is, each graph node may be associated with a corresponding timer interval which defines the maximum amount of time (e.g., seconds or clock cycles) that a partially-filled vector may reside at that node.

Figure 6:
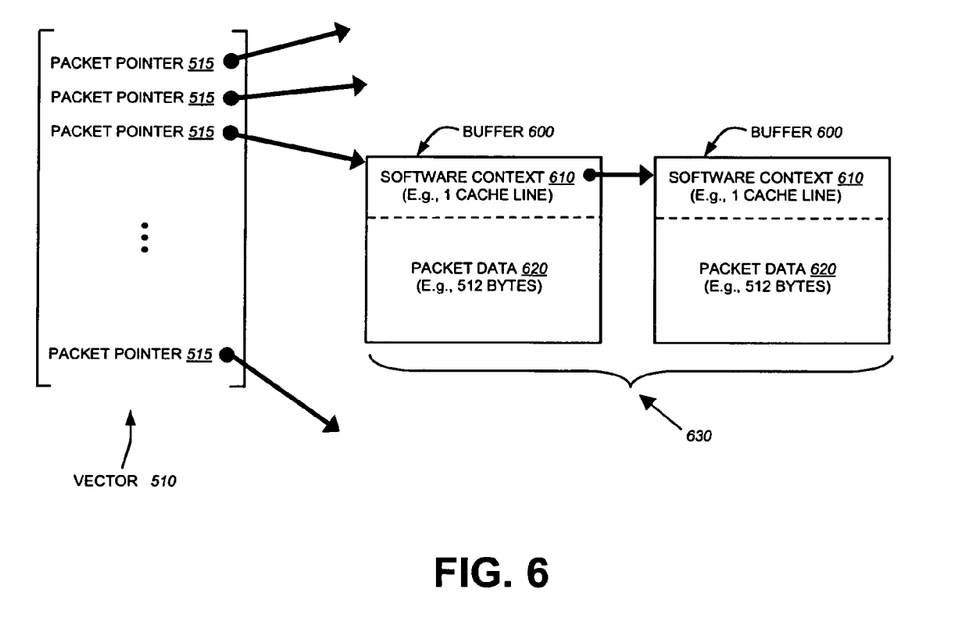
FIG. 6 is a schematic block diagram of an exemplary vector that may be passed between graph nodes in accordance with an illustrative embodiment of the present invention.

A portion of the memory 440 may be organized as a buffer "pool" 480 containing a plurality of data buffers 600 adapted to store received packet data. For example, each buffer may be configured to store up to a fixed amount, e.g., 512 bytes, of packet data. Operationally, packet data received by a network interface 410 is forwarded through the system controller 420 and stored in a "free" data buffer 600, i.e., a buffer that is available to store newly received data. The interface 410 that received the data then enqueues a buffer pointer on its associated ingress ring 490a, e.g., stored at a predetermined location in the memory 440. The enqueued buffer pointer stores a value that may be used to locate the buffer 600 in the memory 440. This process is continued until the entire data packet 100 has been received by the network interface and stored in one or more data buffers 600.

Next, the forwarding engine 460 detects, e.g., by periodically polling the contents of the ingress ring 490a, that the received packet 100 is ready to be processed. Thereafter, the engine 460 dequeues the packet's buffer pointers from the network interface's ingress ring 490a and processes the packet in accordance with the forwarding graph 500. Of note, if the packet is addressed to the intermediate network node 400, then the forwarding engine may "punt" the packet to the router operating system 450 for processing. Such a situation may arise if the received packet 100 is a network management packet, such as an OSPF packet. Having rendered a forwarding decision for the received data packet 100, the forwarding engine enqueues the packet's buffer pointers on an appropriate egress ring 490b corresponding to a network interface 410 coupled to the packet's next destination. The packet is then transmitted over the network interface and the packet's buffer pointers are dequeued from the egress ring 490b so that their referenced buffers 600 may be "free" to store new packet data.

FIG. 5 is a schematic diagram of an exemplary forwarding graph 500 that may be used advantageously with the present invention. The graph 500 includes a plurality of graph nodes 505-509, each node corresponding to a different set of forwarding operations that may be performed by the processor 434a executing the forwarding engine 460. In accordance with an illustrative embodiment, each graph node is configured to process a plurality of data packets concurrently, rather than one packet at a time. To that end, data packets are exchanged among the graph nodes 505-509 in units of vectors (or "superframes") containing one or more data packets.

Suppose a network interface 410 receives one or more data packets 100. The network interface stores the packet data in one or more data buffers 600, e.g., in the buffer pool 480, and enqueues buffer pointer(s) referencing the buffers on an ingress ring 490a associated with the network interface 410. The forwarding engine 460 instructs the processor 434a to periodically poll the contents of the ingress ring 490a. As a result, the processor detects the enqueued buffer pointer(s) on the ingress ring, thus indicating that the received packet(s) is ready to be processed. Next, the processor 434a loads instructions, e.g., from a predetermined location in the main memory 440, for performing forwarding operations associated with the first graph node 505. More specifically, the processor loads the graph-node instructions into its I-cache 436a (if they are not already stored therein) and then sequentially executes the instructions.

The first graph node's instructions direct the processor 434a to access the "head" of the network interface's associated ingress ring 490a and dequeue the buffer pointer(s) corresponding to received data packets 100. Notably, the order in which the buffer pointers are enqueued on the ingress ring 490a coincides with the order in which their referenced data packets 100 were received at the network interfaces 410. Thus, as the processor 434a dequeues buffer pointers from the head of the ingress ring 490a, the processor can use the dequeued pointers to retrieve the data packets 100 in the same order in which they were received. The data packets are then added to a vector 510 in a manner that preserves the relative order in which the packets were received. While each packet's data may be bodily incorporated into the vector 510, preferably the vector contains an ordered list of pointers 515 referencing respective lists (or "chains") of data buffers 600 containing the packets' data. For instance, the data packet referenced by the vector's first packet pointer 515 is received prior to the packet referenced by the vector's second pointer 515, and so forth.

FIG. 6 illustrates the exemplary vector 510 in more detail. The vector contains one or more packet pointers 515, e.g. 32-bit values, that reference the memory locations of corresponding buffer chains 630. Preferably, the vector 510 may store up to a predetermined maximum number of packet pointers, e.g., 256 pointers. As used herein, each buffer chain 630 comprises an ordered list of one or more data buffers 600 which collectively store a data packet 100 received by the intermediate network node 400. Accordingly, each packet pointer 515 stores a value referencing the memory location of the first data buffer 600 in its corresponding list of data buffers.

As shown, each data buffer 600 includes a software-context portion 610 and a packet-data portion 620. The software context, which is preferably one cache line (e.g., 32 bytes) in length, contains packet-related information that may be used by forwarding instructions associated with the graph nodes 505-509. For instance, the software context 610 may include a pointer whose value references the memory location of an adjacent buffer 600 in a buffer chain 630. In addition, the software context may store other information including, but not limited to, the amount of packet data stored in the buffer 600, the location of packet-header information in the buffer chain 630, etc. The packet-data portion 620 is configured to store a predetermined amount of packet data, e.g., 512 bytes.

Referring again to FIG. 5, the vector 510 may be associated with a corresponding set of auxiliary (AUX) data 520. Namely, each data packet 515 in the vector 510 may be associated with a corresponding data value 525 in the AUX data 520. Therefore, when the vector contains N data packets, an associated set of N data values are contained in the vector's set of AUX data. Preferably, each data value 525 stores a relatively small of data, e.g., 1-3 bytes. The AUX data values 525 may include, inter alia, various packet-related information, such as packet-type identifiers, hash keys, and so forth.

Advantageously, the AUX data 520 may be used to reduce the number of data read operations that are performed by the processor 434a executing the forwarding engine 460, and thus may reduce the number of cache misses that occur in the D-cache 438a. Data is usually retrieved by the processor in units of cache lines, e.g., 32 bytes, which are larger than the size of the AUX data values 525, e.g., 1-3 bytes. To retrieve an AUX data value 525 conventionally, the processor has to retrieve at least one full cache line worth of data from the main memory 440, even if the AUX value is significantly smaller in size than a full cache line. Thus, retrieval of N relatively small AUX data values in prior implementations would result in a relatively large number of data read operations to the memory 440.

In contrast, according to the illustrative embodiment, the AUX data 520 may be passed between graph nodes and stored directly in the D-cache 438a. As such, forwarding instructions at the receiving graph node 506 can access the set of AUX data values 525 from the cache memory without having to retrieve larger blocks of data, e.g., one or more cache lines worth of data, from the main memory 440. In this way, the processor 434a may significantly reduce the number of data read operations it performs as compared with the previous implementations.

In the illustrative embodiment, the AUX data 520 is organized as a separate vector which is passed between graph nodes in the forwarding graph 500. In this arrangement, the AUX data values 525 may be more easily processed by a vector processor (not shown) which may be coupled to the processor 434a and adapted to execute graph-node forwarding instructions. Those skilled in the art will appreciate that the AUX data 520 alternatively may be concatenated or otherwise incorporated into the vector 510. Yet other embodiments may store the packets' AUX data in different memory locations, such as in the packets' software-context portions 610, or may not utilize AUX data at all.

When a full vector's worth of packets, e.g., 256 packets, has been added to the vector 510 or a graph-node timer 570 associated with the node 505 has expired, the forwarding engine 460 dispatches both the vector 510 and the AUX data 520 to the next graph node 506. Here, it is noted that the interval of the timer 570 may be selected by the forwarding engine 460 so as to prevent excessive processing delays at the graph node 505. For instance, if data packets are received at the network interfaces 410 at a relatively high rate, e.g., millions of packets per second, then the interval of the timer 570 may be selected to be relatively short in duration to ensure that buffer pointers are dequeued from the ingress rings 490a at a suitable rate. For example, the processor 434a may experience excessive "idling" time at the graph node 505 if the timer interval 570 is selected to be too long in duration. In such a case, the ingress rings 490a may become "full," i.e., store their maximum number of buffer pointers, thereby causing newly received packets to be "dropped" at the network interfaces 410.

After the vector 510 and AUX data 520 have been dispatched to the graph node 506, forwarding instructions for the graph node 506 are loaded into the I-cache 436a and executed by the processor 434a. The forwarding instructions direct the processor 434a to perform Ethernet-decode operations for packets in the vector 510. As shown, the Ethernet-decode operations examine each packet 515 in the vector and determine whether the packet's Ethernet-type field 130 stores a value corresponding to an IPv4 datagram (0x0800) or a PPPoE PDU (0x8864). Illustratively, the AUX data values 525 dispatched from the graph node 505 may store the packets' Ethernet-type field values 130 so as to reduce the number of data read operations that are performed by instructions at the graph node 506.

Often, most packets received at the intermediate network node 400 are of the same packet type, e.g., IPv4 data packets. Therefore, the majority of the packets 515 will be directed from the graph node 506 to the graph node 507 which is configured to process/validate IPv4 data packets. However, some of the data packets 515 in this example may be directed from the node 506 to a graph node (not shown) configured to process PPPoE PDUs. Therefore, after being processed at the graph node 506, the vector 510 is essentially partitioned into two subsets, i.e., one subset containing IPv4 packets and another subset containing PPPoE packets. For simplicity, it is assumed that only these two types of data packets are processed by the forwarding graph 500. Clearly, other embodiments may employ forwarding graphs that are configured to process other types of data packets.

The two subsets of packets 515 may be stored in respective vectors 530 ($V_1$) and 540 ($V_2$), which are routed to appropriate subsequent graph nodes in the forwarding graph 500. In addition, each of the vectors 530 and 540 may be associated with corresponding sets (e.g., vectors) of AUX data 535 and 545. The AUX data 535 and 545 need not contain the same type of data values. For instance, the data values stored in the AUX data 535 may be specific to IPv4 datagrams, whereas the data values stored in the AUX data 545 may pertain to the PPPoE protocol. Moreover, the AUX data 535 and 545 may contain different types of data values than those stored in the AUX data 520. For instance, while the AUX data values 525 may store Ethernet-type field values, the AUX data 535 and 545 may store different data values, such as hash-key identifiers, etc.

Operationally, a timer 575 associated with the graph node 506 starts running once the vector 510 is received at the graph node 506. The packets 515 contained in the vector 510 are processed and assigned to an appropriate output vector 530 or 540. The graph node 506 continues to receive and process vectors 510 until one or both of the vectors 530 and 540 contains a full vector's worth of packets, e.g., 256 packets, or the timer 575 expires. When any of these events occurs, the vectors 530 and 540 are dispatched to their next, subsequent graph nodes. For example, suppose the timer 575 expires before a full vector 530 or 540 is acquired at the graph node 506. In this case, the partially-filled vectors 530 and 540 are dispatched to their appropriate subsequent graph nodes. It is important to note that any data packets 515 that have not yet been processed at the graph node 506, and thus have not been assigned to either vector 530 or 540, are not dispatched along with the vectors 530 and 540 (and their associated AUX data 535 and 545).

The vector 540 and its associated AUX data 545 are received at the graph node 507 which is configured to perform IPv4 validation operations for the vector's contained is IPv4 data packets. A set of forwarding instructions associated with the graph node 507 is loaded in the I-cache 436*a*, and the instructions are executed by the processor 434*a*. In addition, a node timer 580 begins running. Once the processor finishes validating the IPv4 packets in the vector 530, or the timer 580 expires, a vector 550 of processed packets is transferred to the graph node 508 whose associated forwarding instructions perform IPv4 forwarding operations. A set of AUX data 555 also may be transferred to the graph node 508.

Having dispatched the vector 550 and the AUX data 555, the forwarding engine 460 loads instructions associated with the graph node 508 into the I-cache 436*a* and starts running a node timer 585 associated with the graph node 508. The graph-node instructions direct the processor 434*a* to render forwarding decisions for the packets contained in the received vector 550. For example, the instructions may instruct the processor 434*a* to perform an address lookup for each of the vector's data packets, e.g., using a multiway "trie" (MTRIE) data structure stored at a predetermined location in the memory 440. Advantageously, at least portions of the MTRIE may be loaded into the D-cache 438*a* and accessed multiple times without having to re-retrieve the MTRIE contents. In this way, address lookups for multiple IPv4 packets in the vector may rely on the same MTRIE data, thereby reducing the number of data read operations that the processor 434*a* has to perform. The result of the MTRIE lookups may direct the processor to locate routing information 470 which is then used by the processor to render forwarding decision for the vector's packets. After a forwarding decision has been made for a data packet, the packet is added to an output vector 560.

When forwarding decisions have been made for each of the data packets in the vector 550, or the timer 585 expires, the vector 560 and its associated AUX data 565 are dispatched to the graph node 509. Then, the forwarding engine 460 loads a set of form warding instructions associated with the graph node 509 into the I-cache 436*a* and starts running a node timer 590 associated with the node 509. The processor 434*a* executes the loaded instructions which direct the processor to determine appropriate egress rings 490*b* on which to enqueue packets in the received vector 560. More specifically, the processor 434*a* enqueues the packets' buffer pointers onto appropriate destination egress rings 490*b* once it has finished processing all the packets in the vector 560 or the node timer 590 expires, whichever occurs first.

The forwarding engine 460 selects timer intervals for the timers 570-590 to ensure that the average latency required to process a packet through the forwarding graph 500 is less than a predetermined target latency, e.g., 50 µs. For instance, the forwarding engine 460 may select each of the five illustrated timer intervals 570-590 equal to 10 µs to ensure the overall latency through the graph is less than the 50 µs target latency. Of course, the engine 460 may select different timer intervals for the different node timers, e.g., depending on the amount of processing and traffic associated with each graph node. By selecting node-timer intervals in this manner, packet processing is less likely to become stalled in the forwarding graph 500, and thus the average latency through the graph is more likely to be less than the predetermined target latency.

Figure 7:
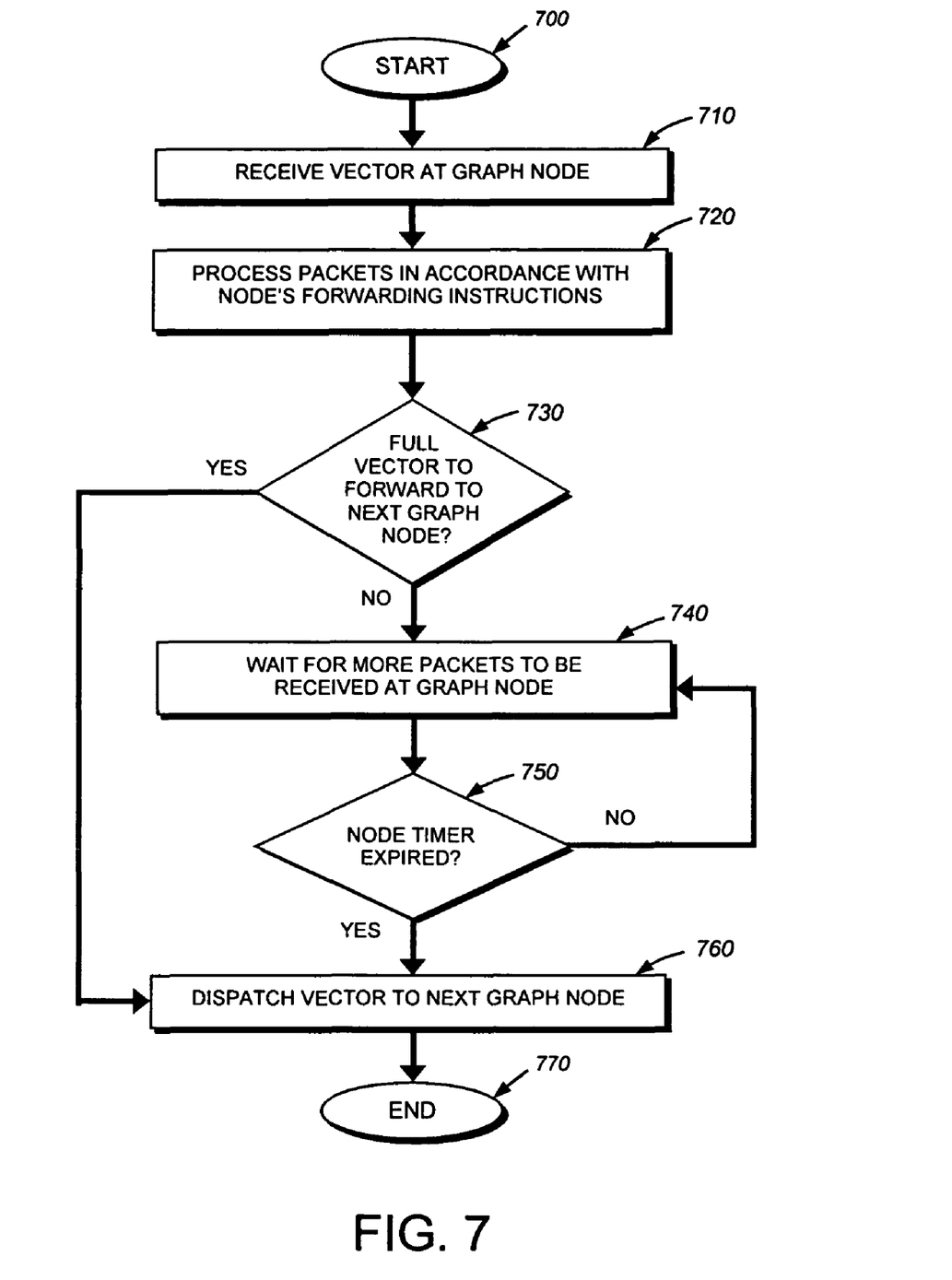
FIG. 7 is a flowchart illustrating a sequence of steps for processing a received vector at a graph node in accordance with the present invention.

FIG. 7 illustrates a flowchart containing a sequence of steps that may be performed for processing a received vector at a graph node in the forwarding graph 500. The sequence starts at step 700 and proceeds to step 710 where a vector is received at the graph node. At step 720, the graph node's corresponding sequence of forwarding instructions is loaded into the I-cache 436*a* and a node timer associated with the graph node begins running. The loaded instructions are repeatedly executed, once per packet, for packets in the received vector. Next, at step 730, the forwarding engine 460 determines whether there is a full vector's worth of processed packets to forward to an appropriate subsequent graph node. If so, then at step 760 an "output" vector containing the processed packets is dispatched to the next graph node and the sequence ends at step 770.

On the other hand, if less than a full vector's worth of packets is ready to be forwarded to the next graph node, e.g., some packets in the received vector were directed to different subsequent graph nodes, then at step 740 the graph node waits for more packets to be received. At step 750, the forwarding engine determines whether the graph node's associated node timer has expired. If so, the partially-filled output vector is dispatched to the next graph node at step 760, then the sequence ends at step 770. However, if at step 750 the node timer has not expired, the sequence returns to step 740 and continues to wait for more packets to be received.

While the forwarding engine 460 may adaptively select the durations of the node-timer intervals 570-590 to control the average latency through the forwarding graph 500, the engine 460 also may adaptively select a vector size ("N") to ensure that the average latency is less than the predetermined target latency, e.g. 50 µs. Preferably, the vector size is calculated based on measured statistics collected by the forwarding engine. Such statistics may include, inter alia, a measured rate ("R") at which packets are input to the forwarding graph and an average time ("T") required to process a packet through the forwarding graph. The vector size then may be calculated, as follows:

$$N = \frac{\text{TARGET LATENCY}}{\left(\frac{1}{R}\right) + T} \tag{1}$$

Illustratively, the forwarding engine 460 uses the calculated value of N to set the maximum number of data packets that may be stored in any vector that may be exchanged between graph nodes. For instance, if the value of N is determined to equal 130, then vectors exchanged between graph nodes are configured to store up to 130 data packets. However, it is also expressly contemplated that the forwarding engine may derive different vector sizes for each of the graph nodes. For instance, the graph node 505 may be associated with a vector size $N_1$, the graph node 506 associated with a vector size $N_2$, and so forth. In either case, the calculated vector size N preferably is not allowed to exceed a predetermined maximum vector size, e.g., 256 packets.

To ensure that its statistics are not skewed, e.g., by non-representative measurements, the forwarding engine 460 preferably randomizes the time horizon over which its statistics are measured. For instance, the forwarding engine first may identify a range of time intervals which yield meaningful sample sizes, then randomly select a sampling interval within the identified range of intervals. The statistics may be periodically updated, e.g., every millisecond.

Figure 8:
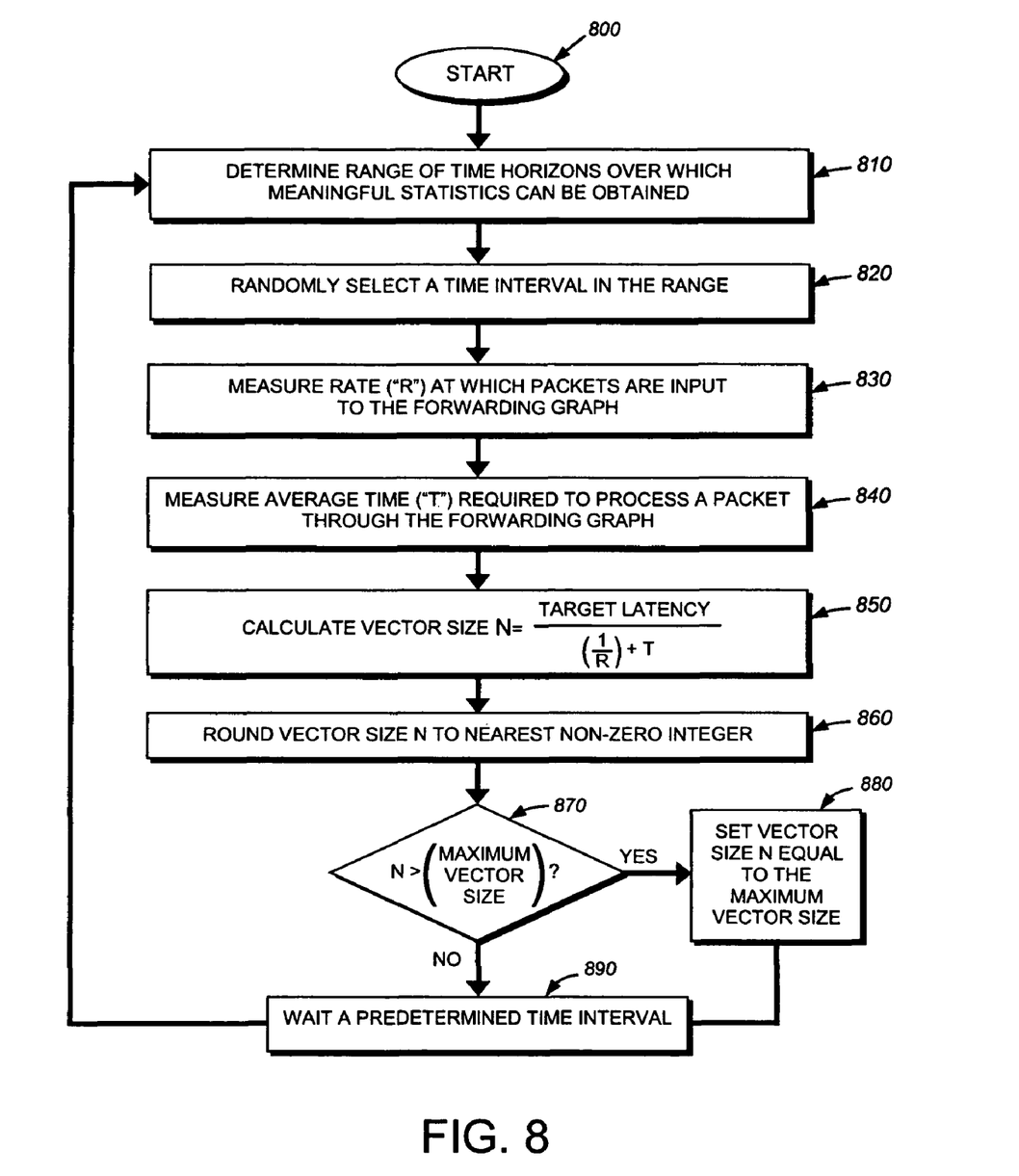
FIG. 8 is a flowchart illustrating a sequence of steps for adaptively selecting a vector size in accordance with an illustrative embodiment of the present invention.

FIG. 8 is a flowchart illustrating a sequence of steps that the forwarding engine 460 may employ for selecting the vector size N. The sequence starts at step 800 and proceeds to step 810, where the engine 460 determines a range of time horizons (i.e., "sampling intervals") over which meaningful statistics can be obtained. Having identified a range of acceptable sampling intervals, at step 820 the forwarding engine randomly selects an interval in the identified range. Next, at step 830, the forwarding engine measures the rate (R) at which packets are input to the forwarding graph 500. At step 840, the forwarding engine measures the average time (T) required to process a packet through the forwarding graph. Notably, the measured rate R and the measured average time T may be determined during the same or different sampling intervals. At step 850, the forwarding engine calculates the vector size N in accordance with Equation (1) above.

At step 860, the calculated vector size N is rounded to the nearest non-zero integer. Then, at step 870, the forwarding engine determines whether the vector size N is greater than a maximum vector size, e.g., 256 packets. If so, at step 880, the vector size N is set equal to the maximum vector size; the sequence proceeds to step 890 where the forwarding engine waits a predetermined time interval before updating the calculated vector size N, as per steps 810-880. If, on the other hand, at step 870 the vector size is less than or equal to the maximum vector size, the sequence proceeds to step 890 where the engine 460 waits a predetermined time interval and then repeats the steps 810-880.

The foregoing has been a detailed description of illustrative embodiments of the invention. Various modifications and additions can be made without departing from the spirit and scope of the invention. For example, while the illustrative embodiment is directed to the exemplary forwarding graph 500, the inventive techniques described herein are more generally applicable to any forwarding graph topology, including those having multiple branches and/or loop-back (or "feedback") paths. Also, instead of the forwarding engine 460 polling the ingress rings 490a to determine whether new data packet(s) 100 have been received, it is also expressly contemplated that the network interfaces 410 (or system controller 420) may send the processor 434a a hardware interrupt to notify the forwarding engine that the received packet(s) is ready to be processed.

Further, those skilled in the art will appreciate that various hardware and software elements described herein may be replaced with their functional equivalents. For example, the illustrative buffer pool 480 may be logically partitioned into separate buffer pools respectively containing data buffers 600 accessible to the router operating system 450 and the forwarding engine 460. It is expressly contemplated that the teachings of this invention can be implemented as software, including a computer-readable medium having program instructions executing on a computer, hardware, firmware, or a combination thereof. The inventive technique therefore may be implemented in various combinations of hardware and/or software. Accordingly, this description is meant to be taken only by way of example and not to otherwise limit the scope of the invention.

What is claimed is:

1. A method for an intermediate network node to efficiently forward data packets, the method comprising:
    organizing packet-forwarding operations performed within the intermediate network node according to a directed forwarding graph, the directed forwarding graph containing a plurality of interconnected graph nodes, each graph node being associated with a corresponding set of packet-forwarding operations;
    receiving two or more data packets at the intermediate network node;
    loading into a cache memory a set of forwarding instructions that implement the set of packet-forwarding operations corresponding to a first graph node in the directed forwarding graph;
    arranging the received two or more data packets in a vector;
    processing the two or more data packets in the vector by repeatedly executing the set of forwarding instructions loaded in the cache memory that implement the set of packet-forwarding operations corresponding to the first graph node in the directed forwarding graph; and
    loading into the cache memory a set of forwarding instructions that implement the set of packet-forwarding operations corresponding to a subsequent graph node,
    wherein each set of forwarding instructions is loaded into the cache memory on a per vector basis.

2. The method of claim 1, further comprising:
    assigning each processed data packet in the vector to an appropriate output vector; and
    transferring each output vector to the subsequent graph node in the directed forwarding graph.

3. The method of claim 1, further comprising:
    adaptively controlling the rate at which data packets are processed through the directed forwarding graph so that the average latency through the forwarding graph is less than or equal to a predetermined target latency.

4. The method of claim 3, wherein the predetermined target latency is 50 microseconds (μs).

5. The method of claim 3, wherein the step of adaptively controlling further comprises:
    measuring statistics associated with the directed forwarding graph; and
    adaptively controlling the rate at which data packets are processed through the directed forwarding graph based on the measured forwarding-graph statistics.

6. The method of claim 5, wherein the step of measuring further comprises:
    identifying a range of time intervals over which meaningful statistics can be obtained; and
    selecting a time interval over which to collect the measured statistics, the selected time interval being within the identified range of time intervals.

7. The method of claim 5, further comprising:
    updating the measured statistics.

8. The method of claim 7, wherein the measured statistics are updated periodically.

9. The method of claim 3, wherein the step of adaptively controlling further comprises:
    selecting respective node-timer intervals for one or more of the graph nodes in the directed forwarding graph, each selected node-timer interval specifying a maximum amount of time that a partially-filled vector is allowed to reside at its associated graph node.

10. The method of claim 3, wherein the step of adaptively controlling further comprises:
selecting a vector size defining a maximum number of data packets that is permitted to be stored in vectors exchanged between graph nodes in the directed forwarding graph.

11. The method of claim 10, wherein the step of selecting a vector size further comprises:
calculating the vector size ("N") based on a measured rate ("R") at which data packets are input to the directed forwarding graph, a measured average time ("T") required to process a packet through the directed forwarding graph, and the predetermined target latency, such that:

$$N = \frac{\text{TARGET LATENCY}}{\left(\frac{1}{R}\right) + T}.$$

12. The method of claim 10, wherein the selected vector size is less than or equal to a predetermined maximum vector size.

13. The method of claim 10, wherein different vector sizes are selected for at least some of the graph nodes in the directed forwarding graph.

14. The method of claim 1, further comprising:
associating a set of auxiliary ("AUX") data with the vector, the AUX data storing packet-related information associated with at least one of the data packets in the vector.

15. The method of claim 14, wherein the step of associating a set of AUX data with the vector further comprises:
storing the AUX data in a second vector to be exchanged between graph nodes in the directed forwarding graph.

16. An intermediate network node, comprising:
a processor;
a network interface to receive two or more data packets; and
a memory configured to store the two or more data packets received at the network interface and further configured to store instructions for execution by the processor, at least a portion of the instructions for performing the steps of:
organizing packet-forwarding operations performed within the intermediate network node according to a directed forwarding graph, the directed forwarding graph containing a plurality of interconnected graph nodes, each graph node being associated with a corresponding set of packet-forwarding operations;
loading into a cache a set of forwarding instructions that implement the set of packet-forwarding operations corresponding to a first graph node in the directed forwarding graph;
arranging the two or more data packets in a vector; and
processing each of the two or more data packets in the vector using the set of forwarding instructions loaded in the cache that implement the set of packet-forwarding operations corresponding to the first graph node in the directed forwarding graph;
loading into the cache a set of forwarding instructions that implement the set of packet-forwarding operations corresponding to a subsequent graph node, wherein each set of forwarding instructions is loaded into the cache memory on a per vector basis.

17. The intermediate network node of claim 16, wherein the memory further comprises instructions for performing the steps of:
assigning each processed data packet in the vector to an appropriate output vector; and
transferring each output vector to the subsequent graph node in the directed forwarding graph.

18. The intermediate network node of claim 16, wherein the memory further comprises instructions for performing the step of:
adaptively controlling the rate at which data packets are processed through the directed forwarding graph so that the average latency through the forwarding graph is less than or equal to a predetermined target latency.

19. The intermediate network node of claim 18, wherein the instructions for adaptively controlling further comprise instructions for performing the step of:
selecting respective node-timer intervals for one or more of the graph nodes in the directed forwarding graph, each selected node-timer interval specifying a maximum amount of time that a partially-filled vector may reside at its associated graph node.

20. The intermediate network node of claim 18, wherein the instructions for adaptively controlling further comprise instructions for performing the step of:
selecting a vector size defining a maximum number of data packets that is permitted to be stored in vectors exchanged between graph nodes in the directed forwarding graph.

21. The intermediate network node of claim 16, wherein the memory further comprises instructions for performing the step of:
associating a set of auxiliary ("AUX") data with the vector, the AUX data storing packet-related information associated with at least one of the data packets in the vector.

22. An intermediate network node, comprising:
means for organizing packet-forwarding operations performed within the intermediate network node according to a directed forwarding graph, the directed forwarding graph containing a plurality of interconnected graph nodes, each graph node being associated with a corresponding set of packet-forwarding operations;
means for receiving two or more data packets at the intermediate network node;
means for loading into a cache memory a set of forwarding instructions that implement the set of packet-forwarding operations corresponding to a first graph node in the directed forwarding graph;
means for arranging the received two or more data packets in a vector; and
means for processing the two or more data packets in the vector by repeatedly executing the set of forwarding instructions loaded in the cache memory that implement the set of packet-forwarding operations corresponding to the first graph node in the directed forwarding graph; and
means for loading into the cache memory a set of forwarding instructions that implement the set of packet-forwarding operations corresponding to a subsequent graph node, wherein each set of forwarding instructions is loaded into the cache memory on a per vector basis.

23. The intermediate network node of claim 22, further comprising:
means for assigning each processed data packet in the vector to an appropriate output vector; and
means for transferring each output vector to the subsequent graph node in the directed forwarding graph.

24. The intermediate network node of claim 22, further comprising:

means for adaptively controlling the rate at which data packets are processed through the directed forwarding graph so that the average latency through the forwarding graph is less than or equal to a predetermined target latency.

25. The intermediate network node of claim 24, wherein the means for adaptively controlling further comprises:

means for selecting respective node-timer intervals for one or more of the graph nodes in the directed forwarding graph, each selected node-timer interval specifying a maximum amount of time that a partially-filled vector may reside at its associated graph node.

26. The intermediate network node of claim 24, wherein the means for adaptively controlling further comprises:

means for selecting a vector size defining a maximum number of data packets that is permitted to be stored in vectors exchanged between graph nodes in the directed forwarding graph.

27. The intermediate network node of claim 22, further comprising:

means for associating a set of auxiliary ("AUX") data with the vector, the AUX data storing packet-related information associated with at least one of the data packets in the vector.

28. A non-transitory computer-readable media including instructions for execution by a processor, the instructions for a method of efficiently forwarding data packets at an intermediate network node, the method comprising the steps:

organizing packet-forwarding operations performed within the intermediate network node according to a directed forwarding graph, the directed forwarding graph containing a plurality of interconnected graph nodes, each graph node being associated with a corresponding set of packet-forwarding operations;

receiving two or more data packets at the intermediate network node;

loading into a cache memory a set of forwarding instructions that implement the set of packet-forwarding operations corresponding to a first graph node in the directed forwarding graph;

arranging the received two or more data packets in a vector;

processing two or more data packets in the vector by repeatedly executing the set of forwarding instructions loaded in the cache memory that implement the set of packet-forwarding operations corresponding to the first graph node in the directed forwarding graph; and loading into the cache memory a set of forwarding instructions that implement the set of packet-forwarding operations corresponding to a subsequent graph node, wherein each set of forwarding instructions is loaded into the cache memory on a per vector basis.

29. The non-transitory computer-readable media of claim 28, wherein the method further comprises:

assigning each processed data packet in the vector to an appropriate output vector; and transferring each output vector to the subsequent graph node in the directed forwarding graph.

30. The non-transitory computer-readable media of claim 28, wherein the method further comprises:

adaptively controlling the rate at which data packets are processed through the directed forwarding graph so that the average latency through the forwarding graph is less than or equal to a predetermined target latency.

31. The non-transitory computer-readable media of claim 30, wherein the step of adaptively controlling further comprises:

selecting respective node-timer intervals for one or more of the graph nodes in the directed forwarding graph, each selected node-timer interval specifying a maximum amount of time that a partially-filled vector may reside at its associated graph node.

32. The non-transitory computer-readable media of claim 30, wherein the step of adaptively controlling further comprises:

selecting a vector size defining a maximum number of data packets that is permitted to be stored in vectors exchanged between graph nodes in the directed forwarding graph.

33. The non-transitory computer-readable media of claim 28, wherein the method further comprises:

associating a set of auxiliary ("AUX") data with the vector, the AUX data storing packet-related information associated with at least one of the data packets in the vector.

34. A method comprising:

organizing packet-forwarding operations performed by a forwarding engine within an intermediate node according to a directed forwarding graph, the directed forwarding graph having a plurality of graph nodes that each correspond to one or more packet-forwarding operations and having a plurality of edges that interconnect selected ones of the graph nodes to indicate a direction for progressing from one graph node to another graph node;

receiving a plurality of data packets at the intermediate network node;

adding the plurality of data packets to a vector;

loading into a cache memory a set of forwarding instructions that implement the set of packet-forwarding operations corresponding to a first graph node in the directed forwarding graph;

processing the data packets of the vector concurrently in accordance with the set of forwarding instructions in the cache that implement the packet-forwarding operations corresponding to the first graph node of the directed forwarding graph; and dispatching an output vector containing processed data packets to be operated on by a set of forwarding instructions that implement the packet-forwarding operations corresponding to a second graph node of the directed forwarding graph.

35. The method of claim 34, wherein the processing the data packets of the vector concurrently is performed by one or more vector processors that perform the set of forwarding instructions that implement the packet-forwarding operations corresponding to the first graph node of the directed forwarding graph.

* * * * *

UNITED STATES PATENT AND TRADEMARK OFFICE
CERTIFICATE OF CORRECTION

| | | |
|---|---|---|
| PATENT NO. | : 7,961,636 B1 | Page 1 of 1 |
| APPLICATION NO. | : 10/855213 | |
| DATED | : June 14, 2011 | |
| INVENTOR(S) | : David Richard Barach et al. | |

It is certified that error appears in the above-identified patent and that said Letters Patent is hereby corrected as shown below:

Col. 13, line 60 should read: "set of ~~form warding~~ forwarding instructions associated with the graph"

Signed and Sealed this

Third Day of January, 2012

David J. Kappos
*Director of the United States Patent and Trademark Office*